INVENTORS
ALBERT L. FREE AND
DE BREMOND B. HOFFMAN
BY
AGENT

INVENTORS
ALBERT L. FREE AND
DE BREMOND B. HOFFMAN
BY

AGENT

Nov. 6, 1951    A. L. FREE ET AL    2,573,762
RADAR RECEIVER SENSITIVITY CONTROL SYSTEM
Filed March 27, 1946    3 Sheets-Sheet 3

INVENTORS
ALBERT L. FREE AND
DE BREMOND B. HOFFMAN
BY
AGENT

Patented Nov. 6, 1951

2,573,762

UNITED STATES PATENT OFFICE 2,573,762

RADAR RECEIVER SENSITIVITY CONTROL SYSTEM

Albert L. Free and De Bremond B. Hoffman, Philadelphia, Pa., assignors, by mesne assignments, to Philco Corporation, Philadelphia, Pa., a corporation of Pennsylvania Application March 27, 1946, Serial No. 657,404

6 Claims. (Cl. 343—7)

This invention relates to improvements in methods of and means for controlling the sensitivity of a superregenerative receiver employed in a radio ranging system of the general sort disclosed in copending application of Wilson P. Boothroyd and Albert L. Free, Serial Number 651,888, filed March 4, 1946, Patent No. 2,536,-488 granted January 2, 1951, assigned to the assignee of the present invention, and of which this application is in part a continuation. In that application there is disclosed the method of controlling the sensitivity of a superregenerative receiver as a function of the delay, with respect to a transmitted pulse, of variably delayed, produced pulses utilized to control the unquenching of the superregenerator to condition it for the reception of a reflected signal from an object at various ranges. Also disclosed are means for achieving this result, involving the generation of pulses of varying widths, timed with reference to transmitter pulses, and the differentiation of the trailing edges of these pulses to yield other pulses having characteristics varying as a function of the widths of the generated pulses, which pulses, resulting from differentiation, were utilized to control the sensitivity of the superregenerator. Although this arrangement yielded entirely satisfactory results under certain conditions, it was found to possess certain limitations, in that, under certain circumstances, the achievable range of variation in sensitivity was not sufficient.

Accordingly, the principal object of the present invention is to provide improved methods of and means for controlling the sensitivity of a superregenerative receiver employed in a radio ranging system, in accordance with the same general method disclosed in the aforementioned copending application and above referred to.

Specifically an object of this invention is to provide methods of and means for appreciably extending the range of sensitivity control achievable in accordance with this general method.

Figure 1:
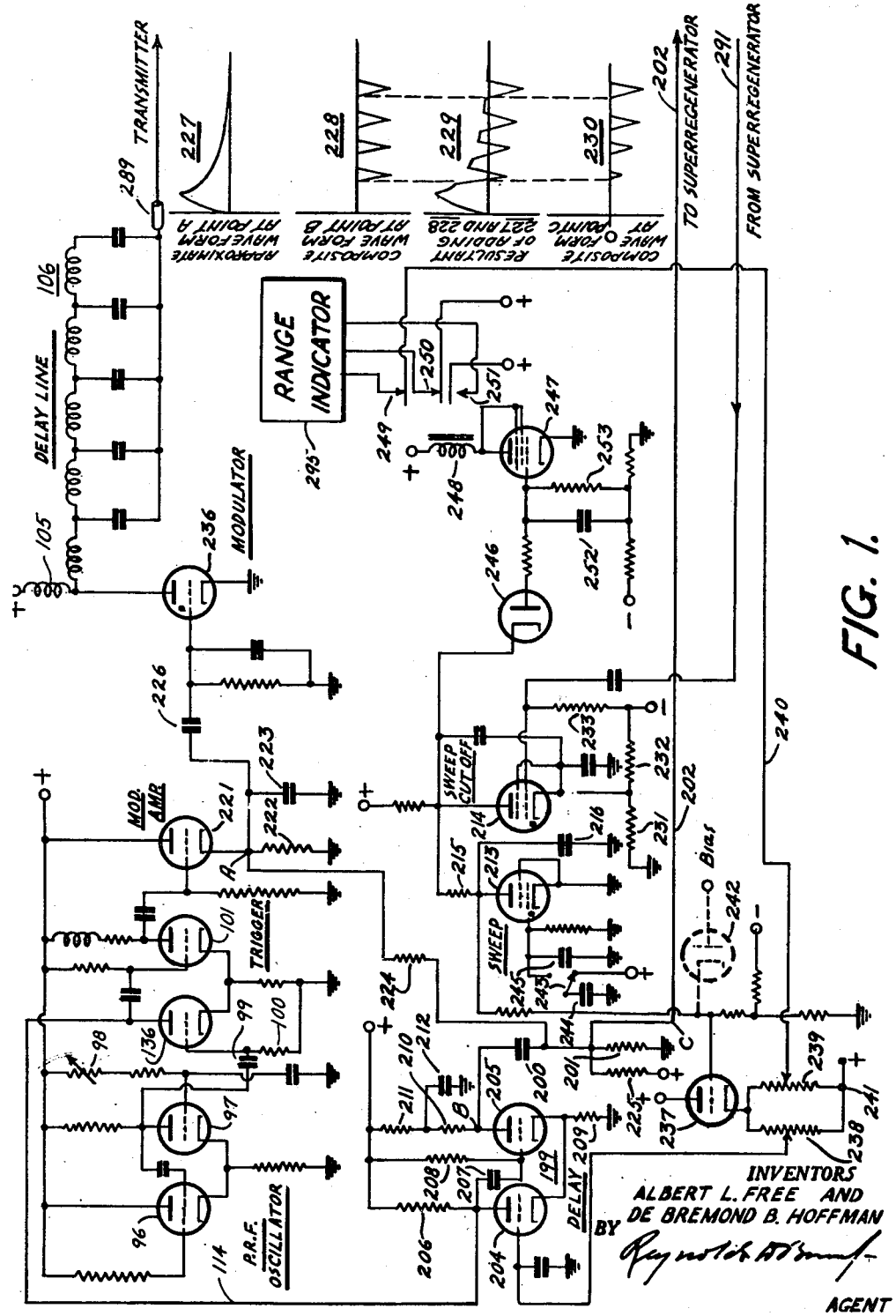
Figure 1A:
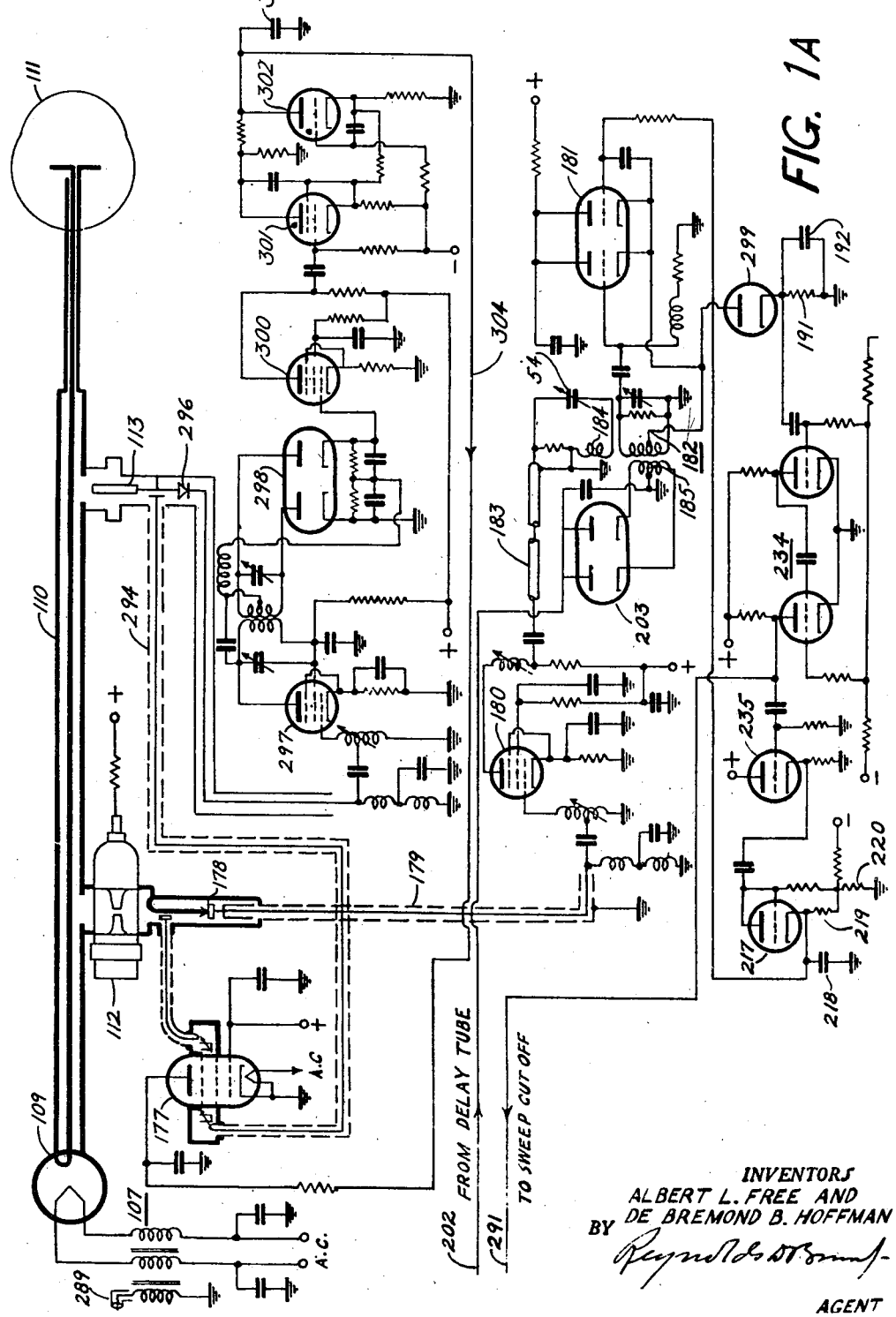
Figure 2:
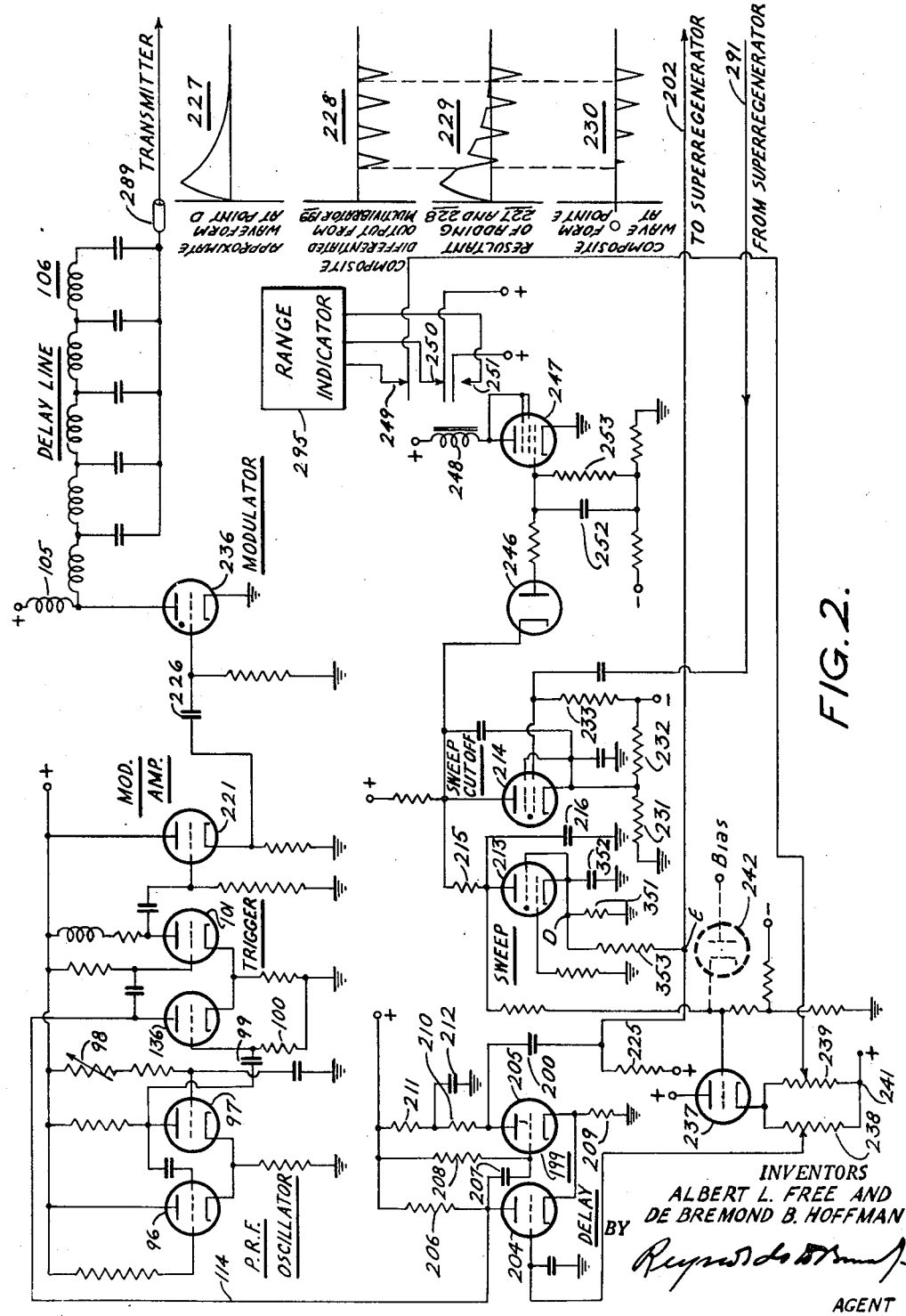

Other features and advantages of the invention will be apparent from a consideration of the following specification and of the drawings, in which:

Figures 1 and 1A, taken together, illustrate the application of the invention in one of its embodiments to a radar ranging system, and Figures 2 and 1A, taken together, illustrate the application of the invention in another embodiment to a radar ranging system.

Referring to Figures 1 and 1A, triodes 96 and 97 are connected to form a cathode feedback multivibrator pulse repetition frequency oscillator, which may be adapted to oscillate at a frequency of approximately 2,000 cycles per second as adjusted by the variable resistor 98. Its circuits should be designed for maximum frequency stability and to give a suitable rectangular wave shape. Although its frequency may vary somewhat this will not affect the operation of the other circuits in accordance with the invention. The negative pulse derived from the plate of tube 97 is supplied through a differentiating circuit comprising condenser 99 and resistor 100 to the grid of a trigger tube 136, the output of which will be a pulse corresponding to the trailing edge of the negative pulse derived from the plate of tube 97. This pulse is fed from the plate of tube 136 to the grid of a trigger amplifier tube 101 and thence to the grid of a cathode follower modulator amplifier tube 221, from the cathode load 222 of which a corresponding pulse is supplied through condenser 226 to the grid of modulator tube 236, which may be a type 3C45 gas tube. The cathode follower tube 221 is used to provide a low impedance drive for the gas tube modulator to avoid variations in the time of its triggering. In the output circuit of the modulator tube 236 is connected a resonant charging choke 105 tuned by the capacitors of delay line 106 which may have a characteristic impedance of approximately 50 ohms and whose input is connected to the plate of the modulator tube in the manner shown. A modulating pulse which may be of the order of 2,200 volts is developed across resonant choke 105 and is supplied, through delay line 106 for shaping purposes, to the primary winding of pulse transformer 107. Included in this connection may be a transmission line 289 having a characteristic impedance of approximately 50 ohms, since in practice magnetron 109, to which the secondary of the pulse transformer 107 is connected, will be located in a separate pressurized unit from the circuits heretofore described. Magnetron 109 may be a type 2J39 tube operating in S band with a peak power output of approximately five kilowatts. Pulsed microwave energy from magnetron 109 may be supplied through a section of stub-supported coaxial transmission line 110 to a suitable radiating and receiving antenna 111. At suitable points along line 110 may be located T-R cavity 112 and capacity probe 113 for signal take-off, the exact functions of which will be explained in further detail hereinafter.

Negative pulse signals at the pulse repetition frequency of 2,000 cycles per second are also supplied from the plate of trigger tube 136 to the plate of tube 204, which together with tube 205 and associated connections comprises a cathode feed-back, non-oscillatory multivibrator. The function of this multivibrator is to generate positive pulses of varying duration whose leading edges correspond to the trailing edges of negative pulses generated by the P. R. F. oscillator. Its mode of operation is generally as follows: The grid of tube 205 is normally biased more positive than the grid of tube 204 so as to cause tube 205 normally to conduct. It should be noted, however, that the bias on tube 205 is determined not only by the potential applied to its grid but also by the drop in the cathode resistor 209 during the time the tube is conducting. Tube 204, on the other hand, is normally cut off. Upon the occurrence of a negative pulse supplied to it through connection 114 from the plate of tube 136, the grid of tube 205 will be driven sufficiently negative to cut off the tube. When this happens the cathode of tube 204 as well as the cathode of tube 205 will be reduced to ground potential and tube 204 will begin to conduct. The current drawn by tube 204 will of course depend upon the bias applied to its grid from potentiometer 238. As tube 204 begins to conduct, its plate will go negative and apply a negative impulse to the grid of tube 205 to maintain it cut off. However this effect will gradually be overcome, as condenser 207 charges through tube 204, until a point is reached at which tube 205 again conducts. The circuit is then in condition to repeat its cycle in response to the next pulse supplied from the trigger tube. The duration of pulses generated by this delay multivibrator will be variable, depending upon the grid bias on tube 204, from 1 to 14 microseconds. From these varying width delay pulses a differentiated signal is derived across the resistor 201 of a differentiating circuit comprising this resistor and condenser 200, and the negative pulses, corresponding to the trailing edges of the variable width pulses from the delay multivibrator, are supplied through connection 202 to unquench a superregenerative receiver whose circuits and mode of operation will be described in further detail hereinafter.

As aforementioned the widths of pulses generated by the delay multivibrator are determined by the voltage applied to the grid of tube 204 from voltage divider 238 in the cathode circuit of tube 237, the grid of which is connected to the plate of sweep tube 213. The latter may consist of a type 2D21 gas tube, between the plate of which and ground is connected a condenser 216. The other constants of this circuit are adjusted so that the sweep tube will normally develop across condenser 216 a saw-tooth voltage having a recurrence frequency of approximately 10 cycles per second. This voltage causes the potential on the grid of tube 204 of the delay multivibrator to vary, thereby varying the duration of the pulses generated by the delay multivibrator from 1 to 14 microseconds 10 times per second. In the absence of any received, reflected signal, the sweep tube will cause the delay multivibrator continually to sweep through the range of pulse widths from 1 to 14 microseconds, corresponding to ranges of from 165 to 2300 yards. However a sweep cut-off tube 214, which may also be a type 2D21 gas tube, is connected in shunt with condenser 216 and is supplied through connection 291 with pulses from the superregenerative receiver output, corresponding to received, target-reflected signals, to discharge the condenser 216 by a predetermined amount determined by resistor 215 whenever such a pulse is received. The amount by which the condenser 216 is discharged by such a pulse is made such that the voltage to which the grid of tube 204 of the delay multivibrator is reduced corresponds to a delay somewhat less than the time actually required for the preceding reflected signal to be received from the target. One reason for this is to take account of any diminution of the distance from the equipment to the target; however a further reason exists as will later be pointed out in describing the operation of the superregenerative receiver.

To prevent the sweep voltage falling below some predetermined potential corresponding to minimum range whenever sweep cut-off tube 214 is fired in response to the simultaneous arrival of a received pulse and unquenching of the superregenerative receiver, the lower end 241 of the cathode load comprising potentiometers 238 and 239 may be connected to a suitable source of fixed positive potential. This will prevent jamming of the system by a strong continuous wave signal impressed on the receiver circuits, which would normally cause the sweep tube to fire continually, the sweep voltage to fall below the potential corresponding to minimum range and the width of the delay pulse to be reduced to such an extent as to permit the receiver to pick up its own transmitted signal. This feature can also be used to prevent the system from locking on targets closer than a predetermined minimum range, such, for example, as other friendly aircraft in a formation. Alternatively the same result might be achieved by connecting the cathode of a diode 242 to the grid of tube 237 and connecting its plate to a suitable source of positive bias. The same result would be achieved but an additional tube would be required.

Sweep tube 213 may also be provided in this embodiment with a special form of in-switch to permit reducing the sweep voltage to zero in order to select a new target at a shorter range. This switching arrangement comprises a switch 243 normally connecting condenser 244 to a source of positive potential. When it is desired to reinitiate the sweep, switch 243 is thrown to its other position, connecting condenser 244 to the grid of sweep tube 213. The voltage developed across the condenser 244 will cause tube 213 to conduct heavily enough to reduce the sweep voltage to that corresponding to the minimum range of the system. The charge on condenser 244 will be quickly lost and the sweep voltage will start again in its normal manner. Condenser 245 is used to damp out the spark resulting when switch 243 is thrown. Condensers 244 and 245 in this arrangement may each have capacitances of 600 $\mu\mu$ farads.

A range signal proportional to the peak voltage across condenser 216 may be derived from divider 239 in the cathode of tube 237 and may be supplied through connection 240 and relay contact 249 to a suitable range indicator 295. Means may be provided for rendering range indicator 295 inoperative in the absence of a received target signal so that no indication will be given by it under these circumstances. The signal for actuating such a device can conveniently be derived from sweep cut-off tube 214 which draws current only in the presence of a received target signal. Because of the high load impedance in the plate circuit of this tube it can not be used as a source of power. Hence a peak detector comprising diode 246 and a high time constant load impedance consisting of condenser 252 and resistor 253 may be connected to the plate of tube 214. The output of this peak detector is supplied to the grid of tube 247, in the plate circuit of which is connected coil 248 of a relay. Contacts 249 and 250 of this relay are normally closed, connecting the range output voltage to range indicator 295 and supplying it with a suitable voltage to render it operative. Contact 251 is normally open but will be closed in the presence of a target signal to apply to the range indicator a suitable voltage for rendering it inoperative. At the same time contacts 249 and 250 will be opened so as to remove the range output signal and the normal operating voltage from the range indicator.

Consideration will now be given to the receiving circuits of the system which, as aforementioned, make use of superregenerative principles. Received, target-reflected signals derived from T-R box 112 are mixed with a signal from local oscillator 177 in crystal mixer 178 and the resulting intermediate frequency is supplied therefrom through transmission line 179 to the input of buffer preamplifier tube 180. It is to be noted that the primary function of this tube is to prevent radiation through the antenna 111 of signal from the superregenerator and that, except for this requirement in certain military applications, the tube might be omitted inasmuch as sufficient amplification is provided by the superregenerator alone. In order accurately to maintain the frequency of the local oscillator 177, which may comprise a type 2K28 klystron, an automatic frequency control circuit is employed. To this end, received signals derived from another point on transmission line 110 by means of capacity probe 113 are mixed in crystal mixer 296 with local oscillator signal supplied through connection 294. The resulting signal is amplified in a suitable intermediate frequency amplifier 297 and supplied to a conventional discriminator comprising double diode 298 and associated circuits. From the output of the discriminator are derived positive or negative pulses, the polarity of which will depend upon the relation between the transmitter and local oscillator frequencies as compared to the intermediate frequency tuning of the discriminator. These pulses are amplified in pulse amplifier tube 300 and are supplied from the output thereof to the grid of a gas discharge tube 301. The latter is connected in shunt with a second gas discharge tube 302 which, together with condenser 303, constitutes a sawtooth oscillator which may be adjusted to operate at a low frequency of, for example, 5 cycles per second. The voltage developed across condenser 303 is supplied through connection 304 to the repeller of local oscillator tube 177 to vary its frequency through a range comprising those frequencies which, when mixed with frequencies within the range at which the transmitter might operate, will yield the desired intermediate frequency. Thus the gas tube oscillator will tend to sweep the frequency of the local oscillator 177 through this range 5 times per second. However the positive pulses from pulse amplifier 300, appearing on the grid of tube 301, will cause it to conduct whenever the frequency of the transmitter exceeds the frequency to which the discriminator is tuned. This will discharge condenser 303 by a certain amount so as to tend to maintain the voltage thereacross, and hence the frequency of local oscillator 177, constant.

The left hand triode section of tube 181, together with tank circuit 182, comprises a superregenerative oscillator which may be adjusted to operate at a frequency in the neighborhood of 60 megacycles. Pulses of intermediate frequency energy corresponding to target signals will be supplied to tank circuit 182 through connection 183 and an inductor 184 coupled to the tank circuit inductance. Unquenching pulses at the P. R. F. rate, and variably delayed with respect to transmitted pulses from the P. R. F. oscillator, are also supplied through connection 202 to a damping circuit comprising double diode 203 and inductor 185 coupled to the inductor of tank circuit 182. As will be explained hereinafter, in accordance with the present invention the characteristics of these unquenching pulses are varied as a function of their delay with reference to transmitted P. R. F. pulses. As the delay of these pulses is varied cyclically in response to the sawtooth wave generated by sweep tube 213, certain unquenching intervals will be caused to coincide with received, object-reflected transmitted signals if the latter are present. In the presence of such received signals oscillations in the tank circuit 182 will build up more rapidly, and to a higher level during the unquench interval, than in their absence. The rate of build-up of oscillations may be adjusted so that, in the absence of received signal, they will not build up during the unquench interval beyond a certain level, while, in the presence of received signal, they will build up appreciably beyond this level. This adjustment is conveniently made by adjustment of the coupling between inductor 184 and that of tank circuit 182, and by adjustment of the tuning of the circuit comprising inductor 184 and condenser 54 to differ somewhat from the resonant frequency of tank circuit 182. As will later be pointed out, the duration of the unquench interval is likewise an important factor in controlling the difference between the output of the superregenerator in the presence and in the absence of received signal. As already mentioned the duration of this interval can readily be controlled by differentiating or otherwise narrowing the pulses generated by the quench oscillator multivibrator.

To distinguish between the output of the superregenerator with and without received signals, there is provided an integrator comprising diode 299, having its plate connected to a tap on the tank circuit inductance, and its cathode grounded through a suitable load impedance comprising resistor 191 and condenser 192. The output derived thereacross is amplified in pulse amplifier 234 and is then supplied through connection 291 to sweep cut-off tube 214 for the purpose hereinbefore described.

As explained in copending application of Albert L. Free, Serial Number 652,320, filed March 6, 1946, Patent No. 2,476,409, granted July 19, 1949, the no-signal output of the superregenerative receiver may be used to control its sensitivity so as to maintain it at an average level which is optimum for the reception of object-reflected signals. In the system shown, automatic regeneration control voltage is derived from triode 217 which, in turn, is supplied with the amplified output of the superregenerator from pulse amplifier 234 through cathode follower tube 235. Where, as in the system here described, the superregenerator is unquenched at the P. R. F. frequency, it is essential that the operation of sweep cut-off tube 214 (Figure 1) be adjusted so that, upon the simultaneous arrival of a received pulse with the unquenching of the superregenerative receiver, the sweep voltage across condenser 216 will be reduced by an amount sufficient to prevent another such simultaneous occurrence during an interval of duration corresponding to that required for the occurrence of a substantial number (e. g. four) of successive unquenchings of the superregenerator. This will insure the A. R. C. voltage being dependent primarily on the output of the superregenerator in the absence of received signal, as desired, rather than on its output in the presence of received signal. Also, as pointed out in the copending application above referred to, the time constant of the A. R. C. circuits should be adjusted so as to permit the A. R. C. voltage to fall to the no-signal level during the intervals between received pulses which arrive simultaneously with the unquenching of the receiver when the system is adjusted as above set forth.

The foregoing description relates primarily to a radar ranging system of the sort to which the present invention is particularly applicable, and which has here been described at some length in order that the nature, mode of operation and applicability of our invention may be more readily and fully understood.

Subject matter shown and described in this specification but not claimed herein is claimed in the following copending applications and patent assigned to the assignee of the present invention as follows:

Application Number 651,398 of William E. Bradley, filed March 1, 1946, now Patent No. 2,536,346 granted January 2, 1951; application Number 651,888 of W. P. Boothroyd and A. L. Free, filed March 4, 1946, now Patent No. 2,536,488 granted January 2, 1951; application Number 651,649, of K. H. Emerson, filed March 2, 1946, now Patent No. 2,536,801 granted January 2, 1951; application Number 660,037 of W. E. Bradley, filed April 6, 1946; and U. S. Patent No. 2,476,409 of Albert Free, issued July 19, 1949.

In general it may be said that, within certain limits, the greater the amplitude or the greater the duration of a given unquenching pulse, the greater will be the sensitivity of the superregenerator during the interval in which such a pulse is applied. The method of the present invention differs from that set forth in the copending application in that it contemplates varying the characteristics of variably delayed unquenching pulses independently and in addition to any variations in their characteristics induced in the course of generating them. More specifically it is contemplated varying their characteristics as a function of the instantaneous amplitude of a waveform recurrent at a frequency which is directly related to the pulse repetition frequency or to the frequency of the sweep oscillator which controls the delay of unquenching pulses with reference to transmitted pulses. According to one embodiment of the invention shown in Figures 1 and 1A, a recurrent waveform at the P. R. F. frequency may be obtained from a pulse shaping network, comprising resistor 222 and condenser 223, connected in the cathode circuit of modulator amplifier tube 221. By proper adjustment of the values of resistor 222 and condenser 223 there may be developed a shaped pulse corresponding to each P. R. F. pulse and of the general form shown at 227. Actually the pulse developed will differ from that shown at 227 in that there will be a large positive excursion at its peak corresponding to the modulating pulse from trigger tube 101. For convenience in illustration this has been omitted since it does not affect the mode of operation in accordance with the invention. The duration of this pulse is preferably made somewhat less than the time interval corresponding to the maximum range of target on which the system is to operate, and the pulse should decrease in instantaneous amplitude from a time in each sweep cycle corresponding to minimum range to a time later in the sweep cycle corresponding to somewhat less than maximum range. The shaped pulse thus derived is supplied through resistor 224 to the point of common connection between condenser 200, resistor 201, and connection 202 which normally supplies unquenching pulses from delay multivibrator 199 to quench tube 203 (Figure 1A) of the superregenerative receiver. Resistor 224 cooperates with resistor 201 to divide the shaped pulse down to the proper amplitude and resistor 224 also serves to isolate shaping network 222, 223 from differentiating network 200, 201, the function of which has already been explained. At 228 are represented unquenching pulses generated by delay multivibrator 199, each delayed by a different amount with respect to a given P. R. F. pulse. For convenience in explanation there are all shown as if occurring in a single sweep interval and as if the P. R. F. pulses to which each is related had all been translated in time and superposed without disturbing the spacings between related P. R. F. and delayed pulses; it should be understood that actually the spacing between any two pulses is the spacing shown plus between any multiple of the P. R. F. period. At 229 is a composite representation of the effect of combining shaped pulses derived from the cathode circuit of tube 221, and corresponding to different P. R. F. pulses, with the variously delayed unquenching pulses developed across resistor 201 as shown at 228. Actually, for any given sweep interval, the resultant waveform will consist of the combination of but one of the pulses shown at 228 with a shaped pulse such as that shown at 227. Quench tube 203 to which these waveforms are applied will conduct during the intervals in which they exceed a predetermined potential level as established by the relative values of resistors 225 and 201 serially connected between a source of positive potential and ground. This will introduce damping into the tank circuit 182 of the superregenerator to inhibit oscillations therein. However, during the intervals corresponding to the negative portions 230 of waveform 229 with reference to this potential level the superregenerator will be unquenched so as to permit oscillations to build up. It will be seen, therefore, that the effect of combining the pulses 228 with the wave 227 is to modify the magnitude characteristics of the original pulses 228 in the manner indicated at 229. By reason of this, only the negative portions of the pulses 229, with reference to the predetermined amplitude level designated by the horizontal axis in the diagram, will be effective to unquench the superregenerator and render it receptive to incoming reflections of the transmitted signals. Moreover, owing to the differences in the magnitude characteristics of the modified pulses, these portions will vary in duration and amplitude as a function of their delay with reference to the transmitted pulses. The reason for this is that, in any superregenerative receiver, the net conductance of the oscillatory circuit, which is common to all superregenerators, is subject to variation throughout a range which includes both positive and negative values. It is only during the intervals of negative net conductance that the superregenerator will respond to signals supplied to its input, and its sensitivity at such times will depend on the durations of the intervals of negative conductance and on the magnitude of the net negative conductance during such intervals, which, in turn, are a function of the magnitude characteristics of the controlling pulses. Since these magnitude characteristics have been caused to vary as a function of pulse delay, in the manner above set forth, the sensitivity of the superregenerator will likewise be caused to vary as a function of this delay. For small delays, corresponding to targets at close range, the sensitivity will be low, while for large delays, corresponding to more distant targets, the sensitivity will be high. The manner in which the sensitivity varies throughout the range over which the system operates may be controlled by varying the shape of pulses derived from the cathode circuit of modulator amplifier tube 221. Although we have found a simple RC circuit suitable for our purposes in the embodiment shown, it will be apparent that other and more complex shaping networks might be used to obtain a specific desired shape. It is not deemed necessary to show other such networks inasmuch as the use of various types of networks to shape signals of various waveforms to obtain other waveforms is well known.

For example only, in the embodiment shown, the modulator amplifier tube 221, from which shaped pulses are derived, may comprise the two sections of a type 6J6 double triode operated in parallel and the various circuit constants may be as follows:

Resistor 222 _____ 4,700 ohms
Condenser 223 _____ 150 $\mu\mu$ farads
Resistor 224 _____ 18,000 ohms
Resistor 201 _____ 4,700 ohms
Resistor 225 _____ 470,000 ohms
Condenser 226 _____ 1,000 $\mu\mu$ farads In particular it was found desirable to make condenser 226 small so that the low impedance from grid to ground caused by firing of modulator tube 236 would not impair the operation of the shaping network 222, 223.

To avoid any possibility of confusion it may be well to point out that the present invention is concerned with controlling the sensitivity of the superregenerative receiver as a function of the range of a target from which signals are to be received, whereas an aforementioned copending application of Kenneth H. Emerson, Serial Number 651,649, filed March 2, 1946, Patent No. 2,536,801 granted January 2, 1951, is concerned with maintaining the average sensitivity of the superregenerator at a particular level in response to the no-signal output of the receiver. Both methods of control are desirable, are consistent with each other, and may be utilized to advantage in the same system as, in fact, they are in the one herein described.

Figures 2 and 1A illustrate a radar ranging system substantially identical to that shown in Figures 1 and 1A, to which the invention is applied in an embodiment differing from that of Figures 1 and 1A. Here the waveform used to vary the characteristics of unquenching pulses as a function of their delay is recurrent at the sweep oscillator frequency rather than at the P. R. F. frequency and is derived across a shaping network comprising resistor 351 and condenser 352 in the cathode circuit of sweep tube 213. These shaped pulses are supplied through a resistor 353 for combination with differentiated pulses from delay multivibrator 199 developed across resistors 351 and 353 in series, which cooperate with condenser 200 to form a differentiating network. The resultant waveform is supplied through connection 202 to unquench the superregenerator as in the previously described instance. Although the recurrent waveform has the period of the sweep oscillator it will have different instantaneous amplitudes corresponding to differently delayed unquenching pulses, and the waveform resulting from its combination with them will produce substantially the same variation of the sensitivity of the superregenerator as was obtained using the arrangement of Figures 1 and 1A.

Although our invention has been described with reference to a particular radar system, it is not to be regarded as limited to use with the particular system shown. It will be apparent that it is applicable to a variety of other systems operating on the same general principles. Accordingly the scope of the invention is to be determined solely by reference to the appended claims.

We claim:

1. In a radio ranging system, a transmitter of time-spaced pulse signals, a superregenerative receiver including an oscillatory circuit and means responsive to control signals of variable magnitude supplied thereto to vary the conductance of said oscillatory circuit throughout a range including positive and negative values as a function of the variations in magnitude of said control signals, a producer of other pulses for controlling the conductance of said oscillatory circuit, means for controlledly varying the time phases of said other pulses with reference to said transmitted pulses to produce controlledly phased unquench pulses, a source of a signal of recurrent waveform, whose values upon the occurrence of said controlledly phased unquench pulses are a predetermined function of said time phases thereof means supplied with said controlledly phased unquench pulses and responsive to said signal of recurrent waveform to modify the magnitude characteristics of said unquench pulses in accordance with the instantaneous magnitude of said recurrent waveform at the occurrence of said unquench pulses, and means for supplying said modified unquench pulses to said conductance varying means to render the conductance of said oscillatory circuit negative during intervals substantially coextensive with said modified unquench pulses to an extent which is dependent upon the modified magnitude characteristics of said unquench pulses, whereby to render said receiver receptive to reflections of said transmitted pulses from target objects during intervals substantially coextensive with said modified unquench pulses and to control its sensitivity during said intervals as a function of said modified magnitude characteristics.

2. A radio ranging system according to claim 1, in which said transmitter is operative to transmit said time-spaced pulse signals at a predetermined repetition frequency, and in which said signal of recurrent waveform is recurrent at said predetermined frequency.

3. A radio ranging system according to claim 1, in which said source of said signal of recurrent waveform is actuated to produce said last-named signal in response to said time-spaced pulses from said transmitter.

4. In a radio ranging system, a transmitter of time-spaced pulse signals, a superregenerative receiver including an oscillatory circuit and means responsive to control signals of variable magnitude supplied thereto to vary the conductance of said oscillatory circuit throughout a range including positive and negative values as a function of the variations in magnitude of said control signals, a producer of other pulses for controlling the conductance of said oscillatory circuit, means for controlledly varying the time phases of said other pulses with reference to said transmitted pulses to produce controlledly phased unquench pulses, means for selecting portions of said unquench pulses which are of certain polarity with reference to a predetermined amplitude level, said last-named means being controllable to vary said level of selection, a source of a signal of recurrent wave form whose values upon the occurrence of unquench pulses are a predetermined function of said time phases thereof, means supplied with said signal of recurrent waveform for controlling said selecting means to vary said level of selection as a predetermined function of said time phases of said unquench pulses with reference to said transmitted pulses, and means for supplying said selected portions of said unquench pulses to said conductance varying means to render the conductance of said oscillatory circuit negative during intervals substantially coextensive with said selected portions to an extent which is dependent upon the magnitudes of said selected portions, whereby to render said receiver receptive to reflections of said transmitted pulses from target objects during intervals substantially coextensive with said selected portions of said unquench pulses and to control its sensitivity during said intervals as a function of the magnitudes of said selected portions.

5. In a radio ranging system, a transmitter of time-spaced pulse signals, a superregenerative receiver including an oscillatory circuit and means responsive to control signals of variable magnitude supplied thereto to vary the conductance of said oscillatory circuit throughout a range including positive and negative values as a function of the variations in magnitude of said control signals, a producer of other pulses for controlling the conductance of said oscillatory circuit, means for controlledly varying the time phases of said other pulses with reference to said transmitted pulses, a source of a signal of recurrent waveform whose values upon the occurrence of said controlledly phased pulses are a predetermined function of said time phases thereof, means for combining said controlledly phased pulses with said signal of recurrent waveform to yield a resultant signal, means for selecting portions of said resultant signal which are of certain polarity with reference to a predetermined amplitude level to yield modified pulses whose magnitude characteristics vary as a function of their time phases with reference to said transmitted pulses, and means for supplying said modified pulses to said conductance varying means to render the conductance of said oscillatory circuit negative during intervals substantially coextensive with said modified pulses to an extent which is dependent upon the magnitude characteristics of said modified pulses, whereby to render said receiver receptive to reflections of said transmitted pulses from target objects during intervals substantially coextensive with said modified pulses and to control its sensitivity during said intervals as a function of said magnitude characteristics.

6. In a radio ranging system, a transmitter of periodic time-spaced pulse signals, a superregenerative receiver adapted to receive reflections of said transmitted pulses from target objects, said receiver including an oscillatory circuit and means responsive to control signals of variable magnitude supplied thereto to vary the conductance of said oscillatory circuit throughout a range including positive and negative values as a function of the variations in magnitude of said control signals, said receiver being subject to shock-excitation by said transmitter during predetermined time intervals immediately following each of said transmitter pulses, a producer of other pulses of substantially uniform amplitude and waveform for controlling the conductance of said oscillatory circuit, means for cyclically varying the time phases of said other pulses with reference to said transmitter pulses to produce controllably-phased unquench pulses, said variation being such that at least some of said unquench pulses occur during said intervals of shock-excitation of said receiver, a source of a signal of recurrent waveform periodic at the repetition rate of said transmitter pulses and having values which decrease substantially exponentially with increases in said time phases of said unquench pulses, means for combining said signal of recurrent waveform with said unquench pulses to produce a resultant signal comprising modified unquench pulses whose peak values differ from a predetermined reference level by amounts which are exponential functions of said time phases thereof, amplitude-discriminatory means supplied with said modified unquench pulses and operative to select only those portions of said last-named pulses having predetermined polarity with respect to said reference level, and means supplying said selected portions of said modified unquench pulses to said superregenerative receiver to vary the conductance thereof.

ALBERT L. FREE.
DE BREMOND B. HOFFMAN.

REFERENCES CITED

The following references are of record in the file of this patent:

UNITED STATES PATENTS

| Number | Name | Date |
|---|---|---|
| 2,167,492 | Sproule | July 25, 1939 |
| 2,406,316 | Blumelin | Aug. 27, 1946 |
| 2,407,198 | Wolff | Sept. 3, 1946 |
| 2,419,570 | Labin | Apr. 29, 1947 |
| 2,421,340 | Levy | May 27, 1947 |
| 2,422,382 | Winchel | June 17, 1947 |
| 2,460,202 | Tyson | Jan. 25, 1949 |
| 2,482,128 | Schmid | Sept. 20, 1949 |

FOREIGN PATENTS

| Number | Country | Date |
|---|---|---|
| 461,749 | Great Britain | Feb. 23, 1947 |